United States Patent
Lim et al.

(10) Patent No.: US 10,334,568 B2
(45) Date of Patent: Jun. 25, 2019

(54) WIRELESS FRAME TRANSMISSION METHOD ON BASIS OF SIGNALING FIELD SORTING OF EACH BAND AND DEVICE FOR SAME

(71) Applicant: LG ELECTRONICS INC., Seoul (KR)

(72) Inventors: Dongguk Lim, Seoul (KR); Jinsoo Choi, Seoul (KR); Hangyu Cho, Seoul (KR); Jinmin Kim, Seoul (KR); Eunsung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/559,781

(22) PCT Filed: Jul. 7, 2016

(86) PCT No.: PCT/KR2016/007401
§ 371 (c)(1),
(2) Date: Sep. 19, 2017

(87) PCT Pub. No.: WO2017/018687
PCT Pub. Date: Feb. 2, 2017

(65) Prior Publication Data
US 2018/0070344 A1   Mar. 8, 2018

Related U.S. Application Data

(60) Provisional application No. 62/198,112, filed on Jul. 28, 2015.

(51) Int. Cl.
*H04W 72/04* (2009.01)
*H04B 7/26* (2006.01)
(Continued)

(52) U.S. Cl.
CPC .......... *H04W 72/0406* (2013.01); *H04B 7/26* (2013.01); *H04L 1/00* (2013.01);
(Continued)

(58) Field of Classification Search
CPC .......... H04B 7/0452; H04B 7/26; H04L 1/00; H04L 27/26; H04L 5/0023; H04L 5/0037;
(Continued)

(56) References Cited

U.S. PATENT DOCUMENTS

2011/0134816 A1   6/2011   Liu et al.
2011/0255620 A1   10/2011  Jones, IV et al.
(Continued)

FOREIGN PATENT DOCUMENTS

WO   2015074461   5/2015

OTHER PUBLICATIONS

PCT International Application No. PCT/KR2016/007401, Notification of Transmittal of the International Search Report and the Written Opinion of the International Searching Authority, or Declaration dated Oct. 11, 2016, 13 pages.
(Continued)

*Primary Examiner* — Kan Yuen
(74) *Attorney, Agent, or Firm* — Lee Hong Degerman Kang Waimey

(57) ABSTRACT

A method for transmitting a frame by an AP includes generating and transmitting a radio frame including a signaling field and a data field. The signaling field includes a SIG A field including first common control information for the plurality of STAs, and a SIG B field including specific control information for each of the plurality of STAs. The second signaling field includes a common field including second common control information for the plurality of STAs, and a specific field following the common field, including the specific control information for each of the (Continued)

plurality of STAs, and the specific field of the second signaling field transmitted in a specific 20-MHz band includes resource allocation information for one or more first-band STAs to which resources are allocated in the first band, and resource allocation information for one or more second-band STAs to which resources are allocated in another 20-MHz band.

13 Claims, 18 Drawing Sheets

(51) Int. Cl.
*H04L 27/26* (2006.01)
*H04L 1/00* (2006.01)
*H04L 5/00* (2006.01)
H04B 7/0452 (2017.01)
H04W 84/12 (2009.01)
H04W 88/08 (2009.01)

(52) U.S. Cl.
CPC ......... *H04L 5/0023* (2013.01); *H04L 5/0037* (2013.01); *H04L 5/0064* (2013.01); *H04L 5/0094* (2013.01); *H04L 27/26* (2013.01); *H04W 72/042* (2013.01); *H04B 7/0452* (2013.01); *H04W 84/12* (2013.01); *H04W 88/08* (2013.01)

(58) Field of Classification Search
CPC ............... H04L 5/0064; H04L 5/0094; H04W 72/0406; H04W 72/042; H04W 84/12; H04W 88/08
See application file for complete search history.

(56) References Cited

U.S. PATENT DOCUMENTS

| | | |
|---|---|---|
| 2013/0223427 A1 | 8/2013 | Sohn et al. |
| 2014/0198877 A1 | 7/2014 | Van Nee |
| 2015/0139206 A1 | 5/2015 | Azizi et al. |
| 2015/0195112 A1 | 7/2015 | Jones, IV et al. |
| 2016/0330300 A1* | 11/2016 | Josiam .................... H04L 69/22 |
| 2016/0330715 A1* | 11/2016 | Chen .................... H04L 27/2607 |
| 2017/0013506 A1* | 1/2017 | Chen ........................ H04L 1/00 |
| 2017/0222769 A1* | 8/2017 | Li .......................... H04L 5/0023 |
| 2018/0124804 A1* | 5/2018 | Yao ........................ H04W 72/12 |

OTHER PUBLICATIONS

European Patent Office Application Serial No. 16830720.5, Search Report dated Feb. 21, 2019, 19 pages.
Stacey, R., "Specification Framework for TGax", doc.: IEEE 802. 11-15/0132r7, XP068097993, Jul. 2015, 13 pages.
Kwon, Y. et al., "SIG Structure for UL PPDU", doc.: IEEE 802. 11-15/0574r0, XP055332592, May 2015, 17 pages.

* cited by examiner

FIG. 13

| | B0 | B1 | B2 | B3 | B4 B9 | B10 B12 | B13 B15 | B16 B18 | B19 B21 | B22 | B23 |
|---|---|---|---|---|---|---|---|---|---|---|---|
| Composite Name: | BW | Reserved | STBC | Group ID | NSTS/Partial AID | | | | | TXOP PS NOT ALLOWED | Reserved |
| SU Name: | BW | Reserved | STBC | Group ID | SU NSTS | Partial AID | | | | TXOP PS NOT ALLOWED | Reserved |
| MU Name: | BW | Reserved | STBC | Group ID | MU[0] NSTS | MU[1] NSTS | MU[2] NSTS | MU[3] NSTS | | TXOP PS NOT ALLOWED | Reserved |
| Bits: | 2 | 1 | 1 | 6 | 3 | 3 | 3 | 3 | | 1 | 1 |

(a)

| | B0 | B1 | B2 | B3 | B4 | B5 | B6 | B7 | B8 | B9 | B10 B17 | B18 B23 |
|---|---|---|---|---|---|---|---|---|---|---|---|---|
| Composite Name: | Short GI | Short GI NSYM Disambiguation | SU/MU[0] Coding | LDPC Extra OFDM symbol | SU VHT-MCS/MU[1-3] Coding | | | | Beam-formed | Reserved | CRC | Tail |
| SU Name: | Short GI | Short GI NSYM Disambiguation | SU/MU[0] Coding | LDPC Extra OFDM symbol | SU VHT-MCS | | | | Beam-formed | Reserved | CRC | Tail |
| MU Name: | Short GI | Short GI NSYM Disambiguation | SU/MU[0] Coding | LDPC Extra OFDM symbol | MU[1] Coding | MU[2] Coding | MU[3] Coding | Reserved | Reserved | Reserved | CRC | Tail |
| Bits: | 1 | 1 | 1 | 1 | 1 | 1 | 1 | 1 | 1 | 1 | 8 | 6 |

(b)

FIG. 14
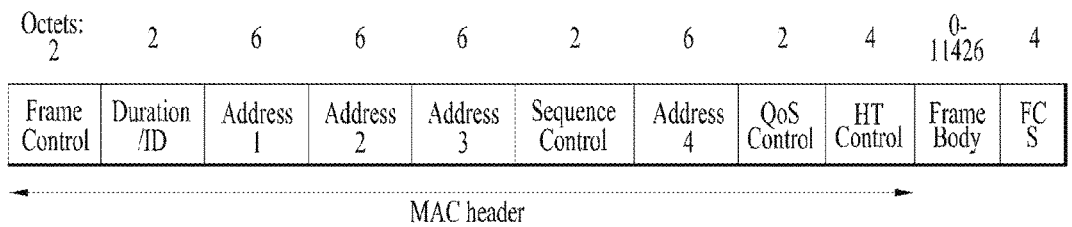
FIG. 15
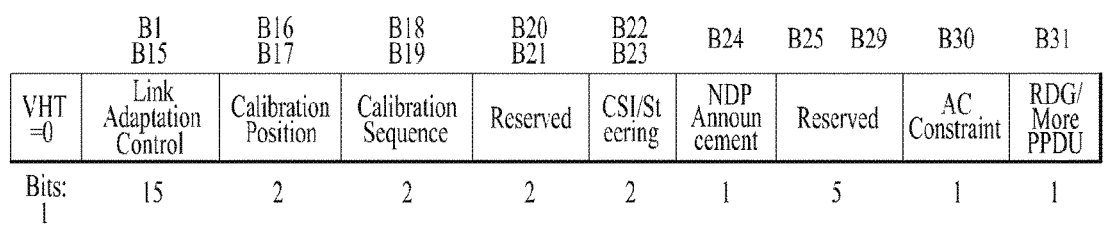
(a)
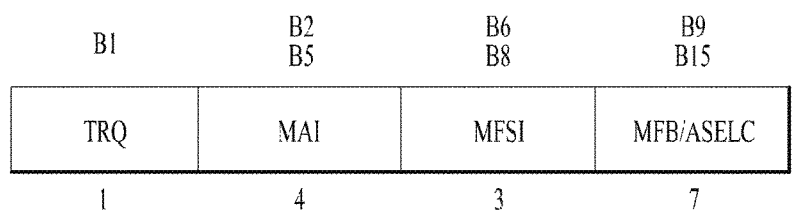
(b)

FIG. 19

| 1 | Common Block for 20LR and 20RR | User Block [0] | User Block [1] | ... | User Block [N-1] |

| 2 | Common Block for 20LL and 20RL | User Block [0] | User Block [1] | ... | User Block [N-1] |

| 1 | Common Block for 20LR and 20RR | User Block [0] | User Block [1] | ... | User Block [N-1] |

| 2 | Common Block for 20LL and 20RL | User Block [0] | User Block [1] | ... | User Block [N-1] |

FIG. 20

| Common Block | User Block [0] | User Block [1] | CRC/Tail | ... | User Block [N-1] | CRC/Tail |

+ CRC/Tail, 1 BCC     1 BCC block for every K user blocks (+ CRC/tail)     Last BCC block may have less than K user blocks (+ CRC/tail)

WIRELESS FRAME TRANSMISSION METHOD ON BASIS OF SIGNALING FIELD SORTING OF EACH BAND AND DEVICE FOR SAME

CROSS-REFERENCE TO RELATED APPLICATIONS

This application is the National Stage filing under 35 U.S.C. 371 of International Application No. PCT/KR2016/007401, filed on Jul. 7, 2016, which claims the benefit of U.S. Provisional Application No. 62/198,112, filed on Jul. 28, 2015, the contents of which are all hereby incorporated by reference herein in their entirety.

TECHNICAL FIELD

The present invention relates to a Wireless Local Area Network (WLAN) system, and more particularly, to a method and apparatus for efficiently transmitting a radio frame by aligning the time-domain length of a signaling field including user-specific information on a 20-MHz band basis in a WLAN system.

BACKGROUND ART

While a proposed frame transmission method as set forth below is applicable to various types of wireless communication, the frame transmission method will be described below in the context of a WLAN system as an example of a system to which the present invention is applicable.

Standards for a WLAN technology have been developed as Institute of Electrical and Electronics Engineers (IEEE) 802.11 standards. IEEE 802.11a and 802.11b use an unlicensed band at 2.4 GHz or 5 GHz. IEEE 802.11b provides a transmission rate of 11 Mbps, and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output-OFDM (MIMO-OFDM). IEEE 802.11n supports a channel bandwidth of up to 40 MHz and, in this case, provides a transmission rate of 600 Mbps.

The above-described WLAN standards have evolved into IEEE 802.11ac that supports a transmission rate of up to 1 Gbit/s by using a bandwidth of up to 160 MHz and supporting eight spatial streams, and IEEE 802.11ax standardization is under discussion.

A radio frame discussed for the IEEE 802.11ax standardization includes a signaling field. If the signaling field includes user-specific information on a 20-MHz band basis, the signaling field may have a different length in each 20-MHz band.

DISCLOSURE

Technical Problem

An object of the present invention is to provide a method for efficiently transmitting a radio frame by aligning the time-domain length of a signaling field including user-specific information on a 20-MHz band basis in a Wireless Local Area Network (WLAN) system.

The present invention is not limited to the above object, and other objects of the present invention will be apparent from the embodiments of the present invention.

Technical Solution

In one aspect of the present invention, a method for transmitting a frame to a plurality of Stations (STAs) by an Access Point (AP) in a Wireless Local Area Network (WLAN) system includes generating a radio frame including a signaling field and a data field, and transmitting the radio frame to a plurality of STAs. The signaling field includes a first signaling field (a SIG A field) including first common control information for the plurality of STAs, and a second signaling field (a SIG B field) including specific control information for each of the plurality of STAs. The second signaling field includes a common field including second common control information for the plurality of STAs, and a specific field following the common field, including the specific control information for each of the plurality of STAs, and the specific field (a first specific field) of the second signaling field transmitted in a specific 20-MHz band (a first band) includes resource allocation information for one or more first-band STAs to which resources are allocated in the first band, and resource allocation information for one or more second-band STAs to which resources are allocated in another 20-MHz band (a second band) other than the first band. The length of the first specific field is set to be equal to the length of the specific field (a second specific field) of the second signaling field transmitted in the second band.

At least one of the first specific field and the second specific field may include padding bits, and a length of the padding bits may correspond to a specific field length difference except for the padding bits.

The second signaling field may be encoded independently in each 20-MHz band, the common field may be block-encoded (Binary Convolutional Coding (BCC)-encoded) into one encoding block in each 20-MHz band, and the specific field may be block-coded by grouping a unit of 'K' STAs (where, 'K' is a natural number equal to or larger than 2) as one encoding block in each 20-MHz band.

The encoding blocks transmitted in the specific field in each 20-MHz band may include an encoding block which is block-coded by grouping the unit of 'K' STAs and an encoding block including control information for STAs remaining from the grouping the unit of 'K' STAs.

The AP may determine a number of STAs to which resource allocation information is to be transmitted in the first specific field and the second specific field, in consideration of a total number of the plurality of STAs.

The AP may determine a number of STAs to which resource allocation information is to be transmitted in the first specific field and the second specific field, in consideration of a total number of encoding blocks to be transmitted in the specific fields of the second signaling field.

The second signaling field may carry independent control information in each of two adjacent 20-MHz bands within a specific 40-MHz band, and control information transmitted in the specific 40-MHz band may be copied and transmitted in a 40-MHz band adjacent to the specific 40-MHz band.

The radio frame may be transmitted in Multi-User Multiple Input Multiple Output (MU-MIMO).

In another aspect of the present invention, an AP for transmitting a frame to a plurality of STAs in a WLAN system includes a processor configured to generate a radio frame including a signaling field and a data field, and a transceiver connected to the processor and configured to transmit the radio frame to a plurality of STAs. The processor is configured to include a first signaling field (a SIG A field) including first common control information for the plurality of STAs and a second signaling field (a SIG B field)

including specific control information for each of the plurality of STAs in the signaling field, to include a common field including second common control information for the plurality of STAs and a specific field following the common field, including the specific control information for each of the plurality of STAs in the second signaling field, to include resource allocation information for one or more first-band STAs to which resources are allocated in a specific 20-MHz band (a first band) and resource allocation information for one or more second-band STAs to which resources are allocated in another 20-MHz band (a second band) other than the first band in the specific field (a first specific field) of the second signaling field transmitted in the first band, and to set the length of the first specific field to be equal to the length of the specific field (a second specific field) of the second signaling field transmitted in the second band.

The processor may include padding bits in at least one of the first specific field and the second specific field, and determine the length of the padding bits in correspondence with a specific field length difference except for the padding bits.

The processor may encode the second signaling field independently in each 20-MHz band, block-code (Binary Convolutional Coding (BCC)-code) the common field into one encoding block in each 20-MHz band, and block-codes the specific field by grouping a unit of 'K' STAs (where, 'K' is a natural number equal to or larger than 2) as one encoding block in each 20-MHz band.

The processor may configure the encoding blocks transmitted in the specific field in each 20-MHz band to include an encoding block block-coded by grouping the unit of 'K' STAs and an encoding block including control information for STAs remaining from the grouping the unit of 'K' STAs.

The processor may determine a number of STAs to which resource allocation information is to be transmitted in the first specific field and the second specific field, in consideration of a total number of the plurality of STAs.

The processor may determine a number of STAs to which resource allocation information is to be transmitted in the first specific field and the second specific field, in consideration of a total number of encoding blocks to be transmitted in the specific fields of the second signaling field.

The processor may control the transceiver to transmit the radio frame in MU-MIMO.

Advantageous Effects

According to an embodiment of the present invention, unnecessary interference can be prevented by aligning the per-band time-domain length of a signaling field in a radio frame.

The effects of the present invention are not limited to the above-described effects and other effects which are not described herein will be understood by those skilled in the art from the following description of the embodiments of the present invention.

DESCRIPTION OF DRAWINGS

FIGS. 9 to 13 are views illustrating exemplary frame structures in an Institute of Electrical and Electronics Engineers (IEEE) 802.11 system.

FIGS. 14, 15, and 16 are views illustrating a Medium Access Control (MAC) frame format.

FIG. 19 is a view illustrating a method for transmitting HE-SIG B in a wide band according to an embodiment of the present invention.

FIG. 20 is a view illustrating encoding of a user-specific field of HE-SIG B on a group basis according to an embodiment of the present invention.

BEST MODE

Figure 1:
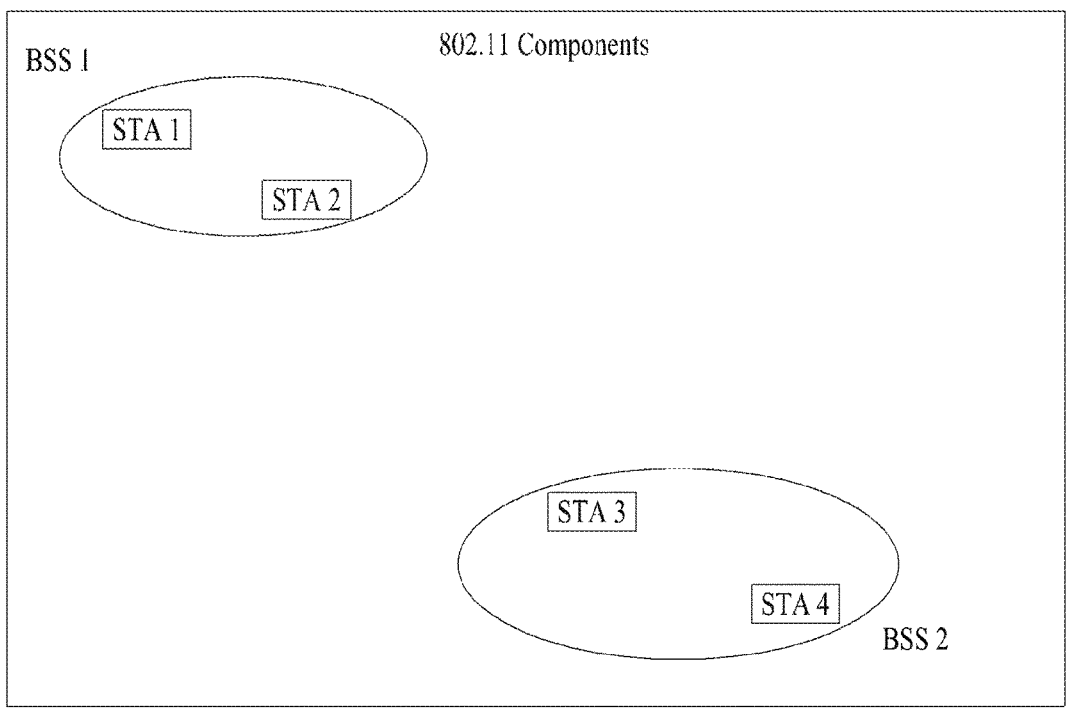
FIG. 1 is a view illustrating an exemplary configuration of a Wireless Local Area Network (WLAN) system.

Reference will now be made in detail to preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be changed. Some constructions or elements of any embodiment may be included in another embodiment, or may be replaced with corresponding constructions or features of another embodiment.

Specific terms as used in the following description are provided to help understanding of the present invention, and these specific terms may be replaced with other terms within the scope and spirit of the present invention.

In some instances, known structures and devices are omitted or are shown in block diagram form, focusing on important features of the structures and devices, so as not to obscure the concept of the present invention. Like reference numerals denote the same components throughout the present disclosure.

The embodiments of the present invention may be supported by standard specifications disclosed for at least one of wireless access systems including an Institute of Electrical and Electronics Engineers (IEEE) 802 system, a $3^{rd}$ Generation Partnership Project (3GPP) system, a 3GPP Long Term Evolution (LTE) system, and a 3GPP2 system. In other words, the steps or parts, which are not described to clearly reveal the technical idea of the present invention, in the embodiments of the present invention may be explained by the above standard specifications. All terms used in the embodiments of the present invention may be explained by the standard specifications.

The following techniques are applicable to a variety of wireless access systems, for example, Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA may be implemented as a radio technology such as Universal Terrestrial Radio Access (UTRA) or CDMA2000. TDMA may be implemented as a radio technology such as Global System for Mobile communication (GSM)/General Packet Radio Service (GPRS)/Enhanced Data rates for GSM Evolution (EDGE). OFDMA may be implemented as a radio technology such as Institute of Electrical and Electronics Engineers (IEEE) 802.11 (Wi-Fi), IEEE 802.16 (WiMAX), IEEE 802-20, and Evolved UTRA (E-UTRA).

The term as used in the present disclosure, first and/or second may be used to describe various components, not limiting the components. These expressions are used only to distinguish one component from another component. For example, a first component may be referred to as a second component and vice versa without departing from the scope of the present disclosure.

When it is said that a part 'includes ' a component throughout the specification, this means that unless otherwise specified, the part may further include another component, not excluding another component. In addition, the term 'unit ', '-er(or) ', or the like signifies a unit of processing at least one function or operation. This may be implemented in hardware, software, or a combination of them.

FIG. 1 is a view illustrating an exemplary configuration of a Wireless Local Area Network (WLAN) system.

As illustrated in FIG. 1, the WLAN system includes at least one Basic Service Set (BSS). The BSS is a set of STAs that are able to communicate with each other through successful acquisition of synchronization.

An STA is a logical entity including a physical layer interface between a Medium Access Control (MAC) layer and a wireless medium. STAs may include an AP and a non-AP STA. Among STAs, a portable terminal manipulated by a user is a non-AP STA. If an STA is simply mentioned, the STA refers to a non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

An AP is an entity that provides access to a Distribution System (DS) to an associated STA through a wireless medium. The AP may also be referred to as a centralized controller, a Base Station (BS), a Node-B, a Base Transceiver System (BTS), or a site controller.

BSSs may be classified into infrastructure BSS and Independent BSS (IBSS).

The BSSs illustrated in FIG. 1 are IBSSs. An IBSS refers to a BSS that does not include an AP. Since the IBSS does not include an AP, the IBSS is not allowed to access the DS and thus forms a self-contained network.

Figure 2:
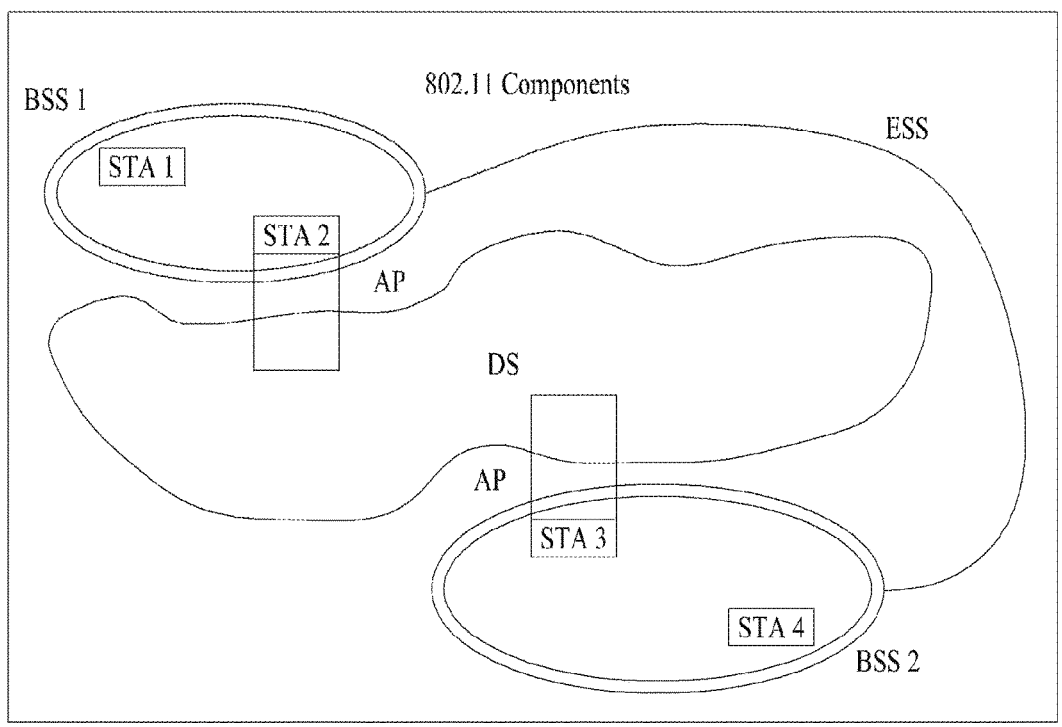
FIG. 2 is a view illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. Although communication between non-AP STAs is basically conducted through an AP in the infrastructure BSS, if a direct link is established between the non-AP STAs, direct communication may be performed between the non-AP STAs.

As illustrated in FIG. 2, a plurality of infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while conducting seamless communication.

The DS is a mechanism that connects a plurality of APs to one another. The DS is not necessarily a network. As long as it provides a specific distribution service, the DS is not limited to any specific type. For example, the DS may be a wireless network such as a mesh network, or a physical structure that connects APs to one another.

Figure 3:
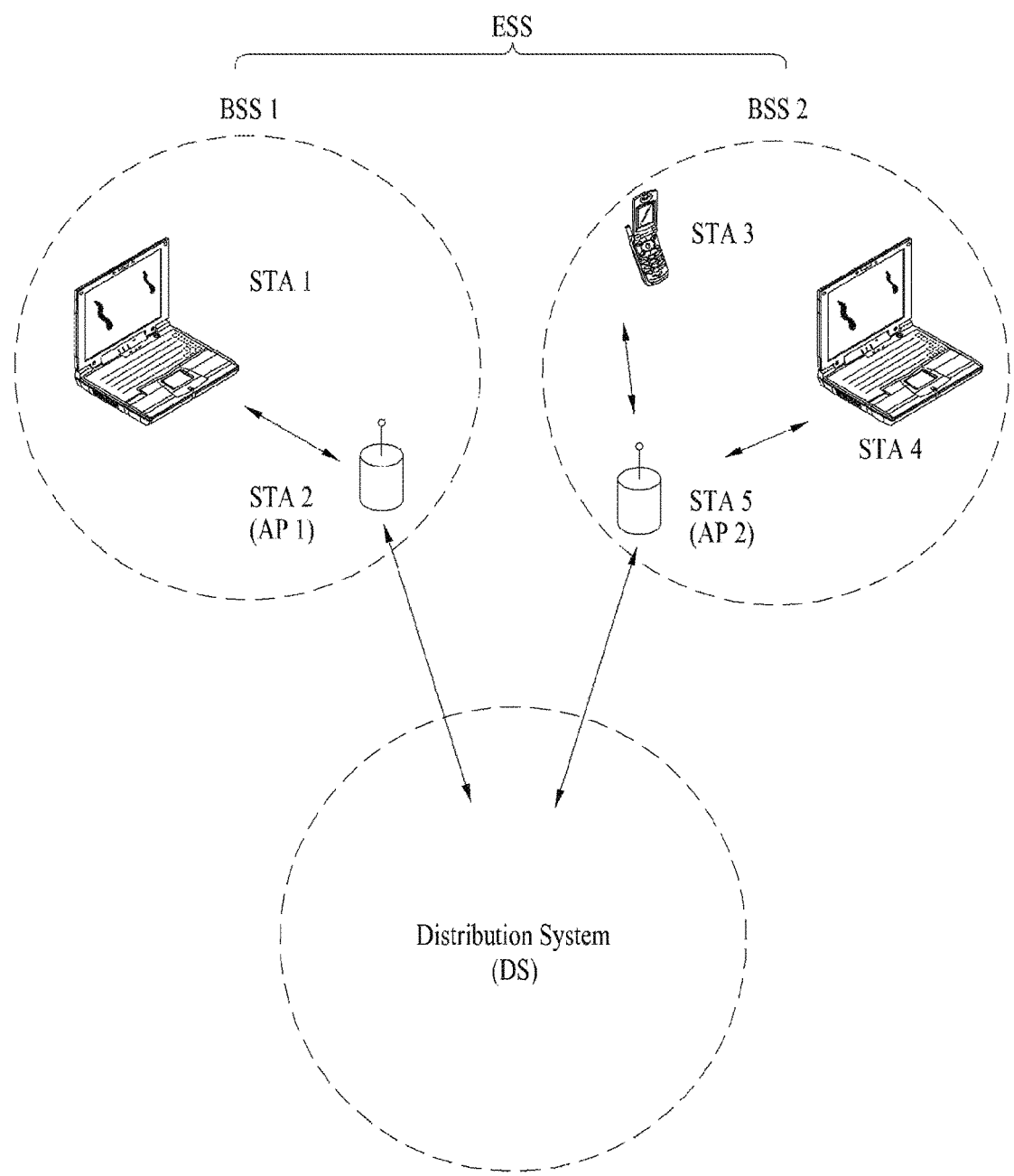
FIG. 3 is a view illustrating an exemplary structure of a WLAN system.

FIG. 3 is a view illustrating an exemplary structure of a WLAN system. In FIG. 3, an exemplary infrastructure BSS including a DS is illustrated.

In the example of FIG. 3, a first BSS (BSS 1) and a second BSS (BSS 2) form an ESS. An STA is a device operating in conformance to the Medium Access Control/Physical (MAC/PHY) regulations of IEEE 802.11 in the WLAN system. STAs include an AP STA and a non-AP STA. The non-AP STA is a device typically manipulated directly by a user, like a mobile phone. In the example of FIG. 3, STA 1, STA 3, and STA 4 are non-AP STAs, and STA 2 and STA 5 are AP STAs.

In the following description, the term non-AP STA is interchangeably used with terminal, WTRU, UE, MS, Mobile Subscriber Station (MSS), or the like. An AP conceptually corresponds to a BS, a Node-B, an evolved No-B (eNB), a BTS, a femto BS, and so on in other wireless communication fields.

Figure 4:
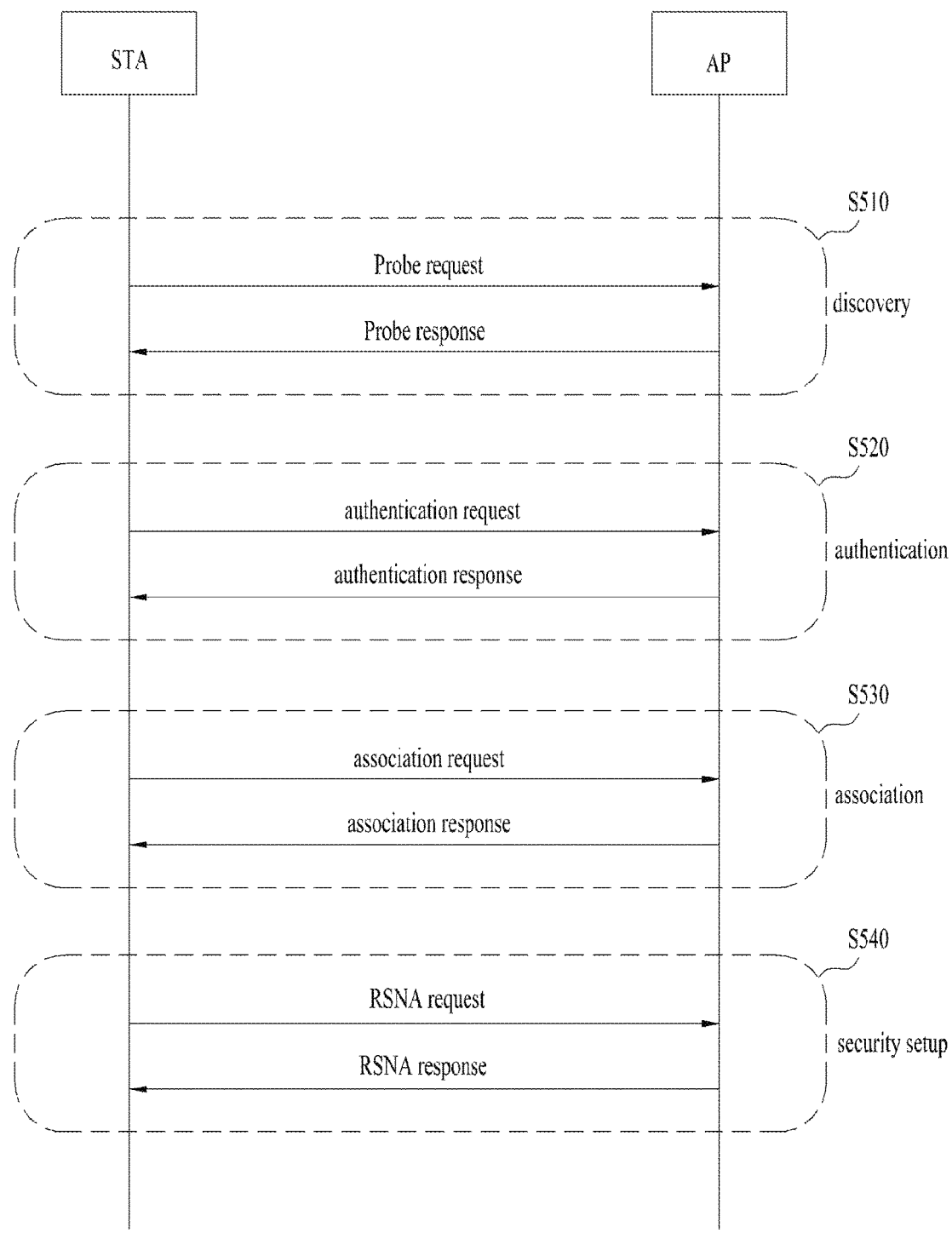
FIG. 4 is a diagram illustrating a signal flow for a general link setup procedure.
Figure 5:
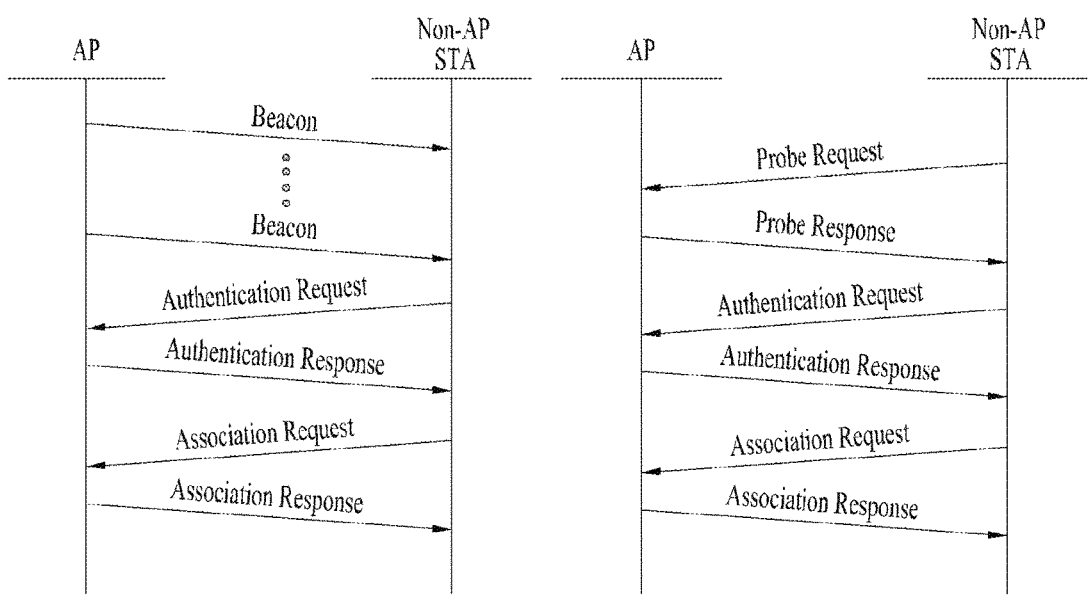
FIG. 5 is a diagram illustrating signal flows for an active scanning method and a passive scanning method.

FIG. 4 is a diagram illustrating a signal flow for a general link setup procedure, and FIG. 5 is a diagram illustrating signal flows for an active scanning method and a passive scanning method.

In order to set up a link with a network and transmit/receive data to/from the network, the STA should perform network discovery, authentication, association, and authentication for security. The link setup procedure may also be referred to as a session initiation procedure or a session setup procedure. In addition, discovery, authentication, association, and security setup steps of the link setup procedure may collectively be referred to as an association procedure.

An exemplary link setup procedure will be described with reference to FIG. 4.

In step S510, the STA may perform network discovery. The network discovery may include scanning of the STA. That is, the STA should search for an available network so as to access the network. The STA should identify a compatible network before joining in a wireless network. The process of identifying a network in a specific region is referred to as scanning.

Scanning is classified into active scanning and passive scanning. While FIG. 4 illustrates a network discovery operation including active scanning, the network discovery operation may involve passive scanning.

In the case of active scanning, a scanning STA transmits a probe request frame and waits for a response to the probe request frame, while switching channels one after another in order to discover an AP around the STA. A responder transmits a probe response frame as a response to the probe request frame to the STA that has transmitted the probe request frame. The responder may be the last STA that has transmitted a beacon frame in a BSS of a scanned channel. In a BSS, since an AP transmits a beacon frame, the AP is a responder, whereas in an IBSS, since STAs of the IBSS sequentially transmit beacon frames, the responder is not constant. For example, if an STA transmits a probe request frame on channel 1 and receives a probe response frame on channel 1, the STA may store BSS information included in the received probe response frame, move to the next channel (for example, channel 2), and perform scanning on the next channel in the same manner (i.e., probe request/response transmission/reception on channel 2).

Referring to FIG. 5, the scanning operation may also be carried out by passive scanning. An STA that performs passive scanning waits for a beacon frame, while switching channels one after another. The beacon frame is one of management frames in IEEE 802.11, which is periodically transmitted to indicate the presence of a wireless network, and enable the scanning STA to search for the wireless network and join in the wireless network. In a BSS, an AP periodically transmits a beacon frame, whereas in an IBSS, STAs of the IBSS sequentially transmit beacon frames. Upon receipt of a beacon frame during scanning, an STA stores BSS information included in the beacon frame, switches to another channel, and records beacon frame information for each channel. Upon receipt of a beacon frame during scanning, an STA stores BSS information included in the received beacon frame, switches to the next channel, and performs scanning on the next channel in the same manner.

A comparison between active scanning and passive scanning reveals that active scanning advantageously has a shorter delay and less power consumption than passive scanning.

After the STA discovers the network, the STA may perform an authentication procedure in step S520. The authentication procedure may be referred to as a first authentication procedure to clearly distinguish the authentication procedure from a security setup procedure of step S540.

The authentication procedure may include transmission of an authentication request frame to an AP by the STA, and transmission of an authentication response frame to the STA by the AP in response to the authentication request frame. The authentication frame used for an authentication request/ response may be a management frame.

The authentication frame may include information about an authentication algorithm number, an authentication transaction sequence number, a status code, challenge text, a Robust Security Network (RSN), a Finite Cyclic Group (FCG), and so on. The above-mentioned information may be an example of part of information that may be included in the authentication request/response frame, and may be replaced with other information or include additional information.

The STA may transmit the authentication request frame to the AP. The AP may determine whether to authenticate the STA based on information included in the received authentication request frame. The AP may provide the result of the authentication to the STA in the authentication response frame.

After the STA is successfully authenticated, the association procedure may be carried out in step S530. The association procedure may involve transmitting an association request frame to the AP by the STA, and transmitting an association response frame to the STA by the AP in response to the association request frame.

For example, the association request frame may include information about various capabilities, a beacon listen interval, a Service Set Identifier (SSID), supported rates, supported channels, an RSN, a mobility domain, supported operating classes, a Traffic Indication Map (TIM) broadcast request, interworking service capability, and so on.

For example, the association response frame may include information about various capabilities, a status code, an Association ID (AID), supported rates, an Enhanced Distributed Channel Access (EDCA) parameter set, a Received Channel Power Indicator (RCPI), a Received Signal to Noise Indicator (RSNI), a mobility domain, a timeout interval (association comeback time), an overlapping BSS scan parameter, a TIM broadcast response, a Quality of Service (QoS) map, and so on.

The above-mentioned information may be an example of part of information that may be included in the association request/response frame, and may be replaced with other information or include additional information.

After the STA is successfully associated with the network, a security setup procedure may be carried out in step S540. The security setup procedure of step S540 may be referred to as an authentication procedure based on a Robust Security Network Association (RSNA) request/response. The authentication procedure of step S520 may be referred to as the first authentication procedure, and the security setup procedure of step S540 may also be simply referred to as an authentication procedure.

For example, the security setup procedure of step S540 may include, for example, a private key setup procedure through 4-way handshaking based on an Extensible Authentication Protocol over LAN (EAPOL) frame. In addition, the security setup procedure may also be carried out in a security scheme that has not been defined in the IEEE 802.11 standards.

Figure 6:
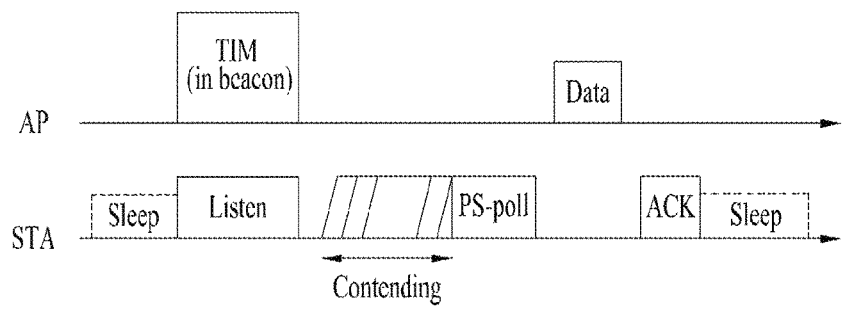
FIGS. 6, 7, and 8 are views illustrating operations of a Station (STA) in response to reception of a Traffic Indication Map (TIM).
Figure 7:
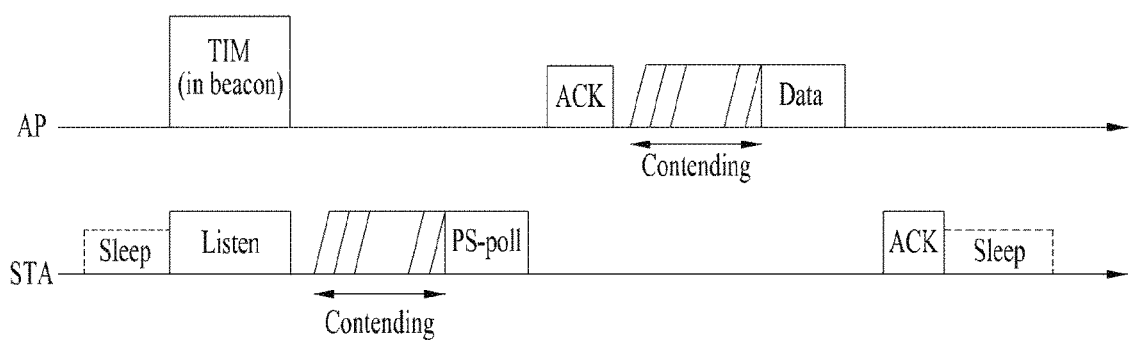
Figure 8:
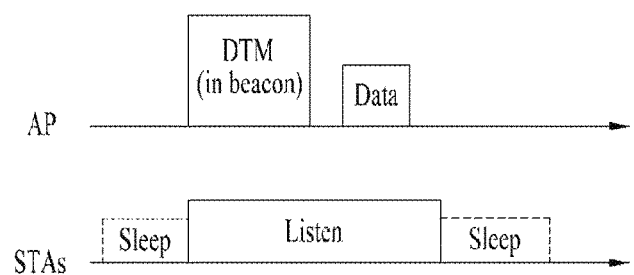
Figure 9:
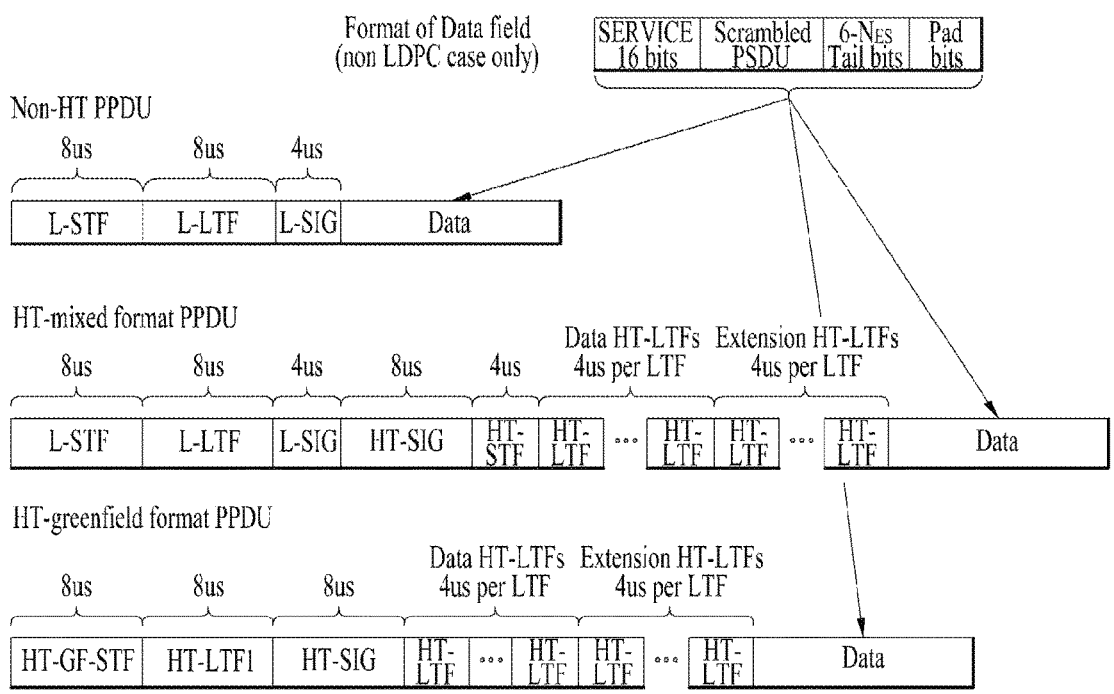

FIGS. 6, 7, and 8 are diagrams depicting an operation of an STA in response to reception of a TIM.

Referring to FIG. 6, the STA may transition from a sleep state to an awake state in order to receive a beacon frame including a TIM from an AP, and may determine the presence of buffered traffic to be transmitted to the STA by interpreting a received TIM element. After contending with other STAs to gain medium access for transmission of a Power Save-Poll (PS-Poll) frame, the STA may transmit the PS-Poll frame to the AP to request transmission of a data frame. Upon receipt of the PS-Poll frame from the STA, the AP may transmit a data frame to the STA. The STA may receive the data frame and transmit an ACKnowledgement (ACK) frame for the received data frame to the AP. Then, the STA may return to the sleep state.

As illustrated in FIG. 6, the AP may transmit the data frame a predetermined time (e.g., a Short Inter-Frame Space (SIFS)) after receiving the PS-Poll frame from the STA, that is, the AP may operate in an immediate response scheme. On the other hand, if the AP does not prepare the data frame to be transmitted to the STA during the SIFS after receiving the PS-Poll frame from the STA, the AP may operate in a deferred response scheme, which will be described with reference to FIG. 7.

In the example of FIG. 7, the STA transitions from the sleep state to the awake state, receives a TIM from the AP, and transmits a PS-Poll frame to the AP after contention in the same manner as in the example of FIG. 6. If the AP does not prepare a data frame during an SIFS in spite of reception of the PS-Poll frame, the AP may transmit an ACK frame to the STA, instead of the data frame. If the AP prepares a data frame after transmitting the ACK frame, the AP may transmit the data frame to the STA after contention. The STA may transmit an ACK frame indicating successful reception of the data frame to the AP, and then transition to the sleep state.

FIG. 8 is a view illustrating exemplary transmission of a Delivery TIM (DTIM) from an AP. STAs may transition from the sleep state to the awake state to receive a beacon frame including a DTIM element from the AP. The STAs may determine from the received DTIM that a multicast/broadcast frame will be transmitted. After transmitting the beacon frame including the DTIM, the AP may transmit data (i.e., the multicast/broadcast frame) immediately without transmitting/receiving a PS-Poll frame. The STAs may receive data, maintaining the awake state after receiving the beacon frame including the DTIM, and return to the sleep state, after completion of the data reception.

FIGS. 9 to 13 are views illustrating exemplary frame structures in an IEEE 802.11 system.

An STA may receive a Physical Layer Convergence Protocol (PLCP) Packet Data Unit (PPDU). A PPDU frame format may include Short Training Field (STF), Long Training Field (LTF), SIGNAL (SIG), and Data. For example, a PPDU format may be configured according to the type of the PPDU frame format.

For example, a non-High Throughput (non-HT) PPDU frame format may include only Legacy-STF (L-STF), Legacy-LTF (L-LTF), SIG, and Data.

The type of a PPDU frame format be one of HT-mixed format PPDU and HT-greenfield format PPDU. An additional STF, LTF, and SIG field (or an STF, an LTF, and a SIG field of a different type) may be included between the SIG field and the Data field in the above-described PPDU formats.

Figure 10:
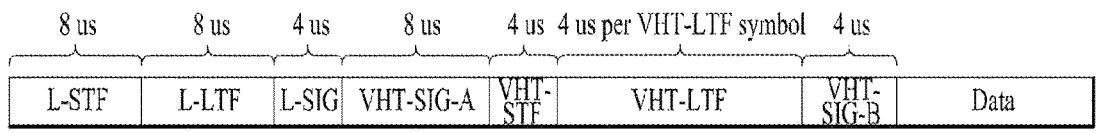

Referring to FIG. 10, a Very High Throughput (VHT) PPDU format may be configured. An additional STF, LTF, and SIG field (or an STF, LTF, and SIG field of a different type) may also be included between the SIG field and the Data field in the VHT PPDU format. More specifically, at least one of VHT-SIG-A, VHT-STF, VHT-LTF, and VHT-SIG-B may be included between the L-SIG field and the Data field in the VHT PPDU format.

STF may be a signal used for Automatic Gain Control (AGC), diversity selection, fine time synchronization, and so on. LTF may be a signal used for channel estimation, frequency error estimation, and so on. STF and LTF may be collectively called a PLCP preamble, and the PLCP preamble may be a signal used for synchronization and channel estimation at an OFDM physical layer.

Figure 11:
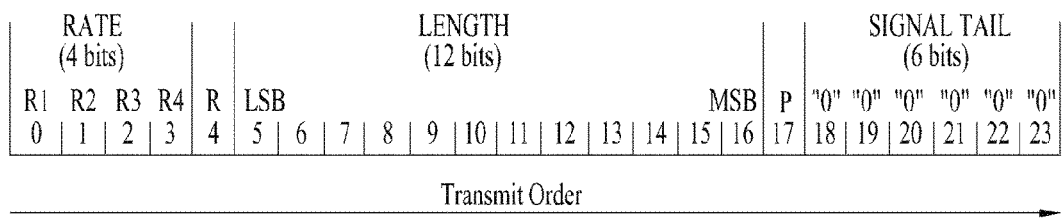

Referring to FIG. 11, the SIG field may include RATE and LENGTH. The RATE field may include information about modulation and a coding rate of data, and the LENGTH field may include information about the length of the data. Additionally, the SIG field may include a parity bit, SIG TAIL bits, and so on.

The Data field may include a SERVICE field, a PLCP Service Data Unit (PSDU), and PPDU TAIL bits. When needed, the Data field may further include padding bits.

Figure 12:
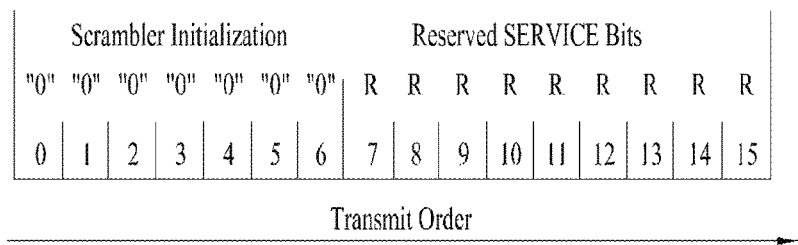

Referring to FIG. 12, a part of the bits of the SERVICE field may be used for synchronization of a descrambler in a receiver, and another part of the bits of the SERVICE field may be reserved. The PSDU corresponds to a MAC Protocol Data Unit (MAC PDU) defined in the MAC layer, and may include data generated/used in a higher layer. The PPDU TAIL bits may be used to return an encoder to a zero state. The padding bits may be used to match the length of the Data field on a predetermined unit basis.

For example, the VHT PPDU format may include an additional STF, LTF, and SIG field (or an STF, LTF, and SIG field of a different type), as described before. L-STF, L-LTF, and L-SIG of a VHT PPDU may be a non-VHT part, and VHT-SIG-A, VHT-STF, VHT-LTF, and VHT-SIG-B of the VHT PPDU may be a VHT part. In other words, areas for non-VHT fields and VHT fields may be defined separately in the VHT PPDU. For example, VHT-SIG-A may include information used to interpret the VHT PPDU.

For example, referring to FIG. 13, VHT-SIG-A may include VHT-SIG-A1 ((a) of FIG. 13) and VHT-SIG-2 ((b) of FIG. 13). Each of VHT-SIG-A1 and VHT-SIG-A2 may include 24 data bits, and VHT-SIG-A1 may be transmitted before VHT-SIG-A2. VHT-SIG-A1 may include BandWidth (BW), Space Time Block Coding (STBC), Group ID, Number of Space-Time Streams/Partial Association ID (NSTS/Partial AID), TXOP_PS_NOT_ALLOWED, and Reserved. VHT-SIG-2 may include Short Guard Interval (GI), Short GI NSYM Disambiguation, Single User/Multi-User[0] Coding (SU/MU[0] Coding), Low Density Parity Check (LDPC) Extra OFDM Symbol, SU VHT-MCS/MU[1-3] Coding, Beamformed, Cyclic Redundancy Check (CRC), Tail, and Reserved. Information about a VHT PPDU may be acquired from these fields.

Figure 16:
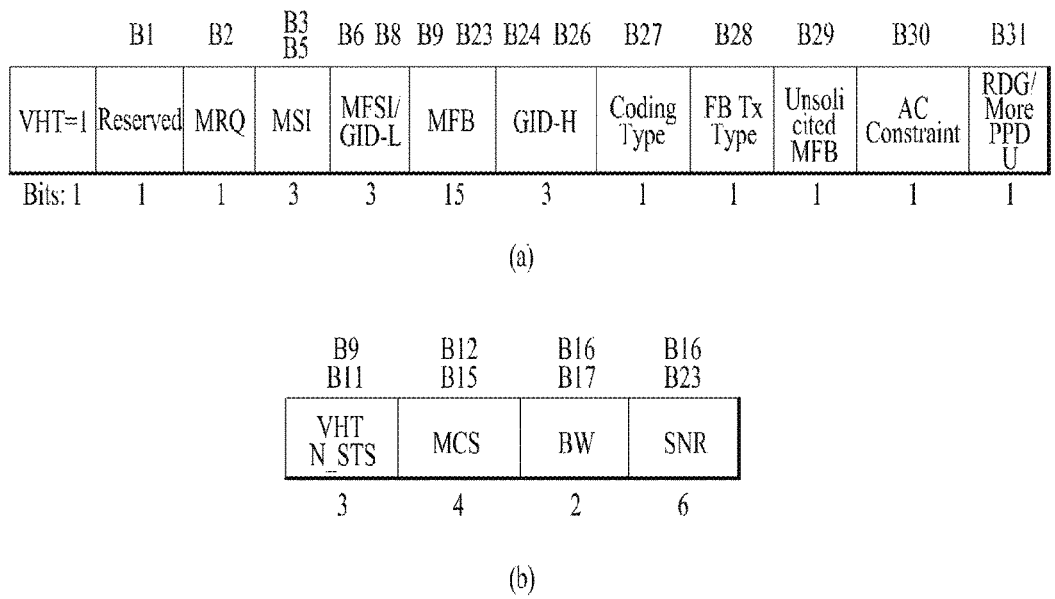

FIGS. 14, 15, and 16 are views illustrating a MAC frame format.

An STA may receive a PPDU in one of the above-described PPDU formats. A PSDU in a data part of the PPDU frame format may include a MAC PDU. The MAC PDU may be defined in various MAC frame formats, and a basic MAC frame may include a MAC header, Frame Body, and Frame Check Sequence (FCS).

For example, referring to FIG. 14, the MAC header may include Frame Control, Duration/ID, Address, Sequence Control, QoS Control, and HT Control. In the MAC header, the Frame Control field may include control information required for frame transmission/reception. The Duration/ID field may be set to a time required to transmit a frame. The Address fields may include identification information about a transmitter and a receiver, which will be described later. For the Sequence Control, QoS Control, and HT Control fields, refer to the IEEE 802.11 standard specifications.

For example, the HT Control field may be configured in two types, HT variant and VHT variant, and include different information according to the types. Referring to FIGS. 15 and 16, a VHT subfield of the HT Control field may indicate whether the HT Control field is of the HT-variant type or the VHT-variant type. For example, if the VHT subfield is set to '0', the HT Control field may be of the HT-variant type, and if the VHT subfield is set to '1', the HT Control field may be of the VHT-variant type.

For example, referring to FIG. 15, if the HT Control field is of the HT-variant type, the HT Control field may include Link Adaptation Control, Calibration Position, Calibration Sequence, CSI/Steering, HT NDP Announcement, AC constraint, RDG/More PPDU, and Reserved. For example, referring to (b) of FIG. 15, the Link Adaptation Control field may include TRQ, MAI, MFSI, and MFB/ASELC. For more details, refer to the IEEE 802.11 standard specifications.

For example, referring to FIG. 16, if the HT Control field is of the VHT-variant type, the HT Control field may include MRQ, MSI, MFSI/GID-LM, MFB GID-H, Coding Type, FB Tx Type, Unsolicited MFB, AC constraint, RDG/More PPDU, and Reserved. For example, referring to (b) of FIG. 16, the MFB field may include VHT N_STS, MCS, BW, and SNR.

Figure 17:
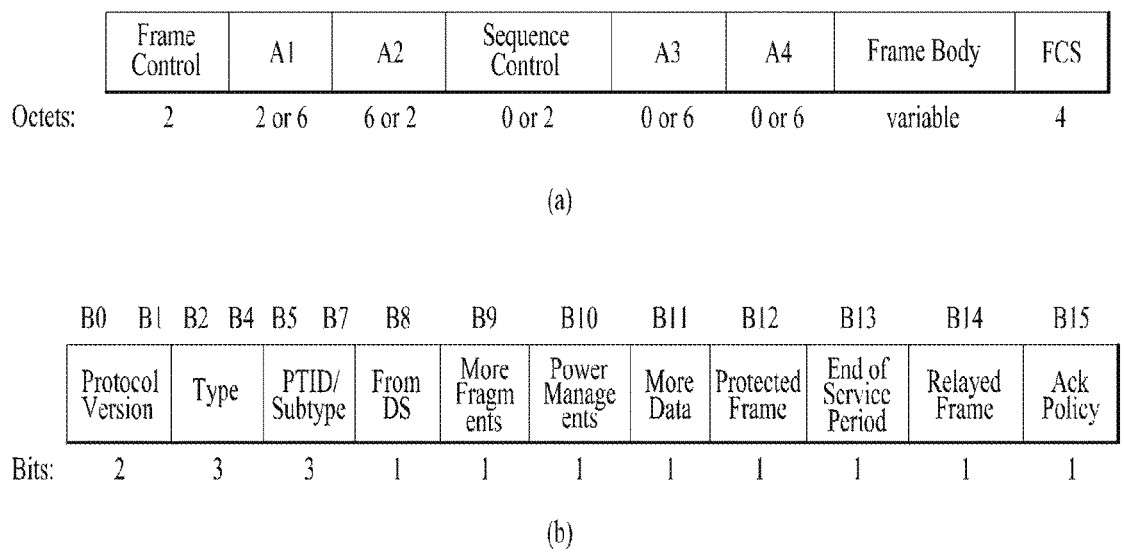
FIG. 17 is a view illustrating a Short MAC frame format.

FIG. 17 is a diagram illustrating a Short MAC frame format. A MAC frame may be configured as a Short MAC frame by reducing unnecessary information when needed, to prevent waste of radio resources. For example, referring to FIG. 17, the MAC header of a Short MAC frame may always include a Frame Control field, an A1 field, and an A2 field. The MAC header may selectively include a Sequence Control field, an A3 field, and an A4 field. Since information unnecessary for a MAC frame is not included in a Short MAC frame in this manner, radio resources may be conserved.

For example, the Frame Control field of the MAC header may include Protocol Version, Type, PTID/Subtype, From DS, More Fragment, Power Management, More Data, Protected Frame, End of Service Period, Relayed Frame, and Ack Policy. For a description of each subfield of the Frame Control field, refer to the IEEE 802.11 standard specifications.

Meanwhile, the Type field is 3 bits in the Frame Control field of the MAC header, with value 0 to value 3 providing address information and value 4 to value 7 being reserved. New address information may be provided using the reserved values in the present invention, which will be described later.

In the Frame Control field of the MAC header, the From DS field may be 1 bit.

Each of the More Fragment, Power Management, More Data, Protected Frame, End of Service Period, Relayed Frame, and Ack Policy fields may be 1 bit. The Ack Policy field may provide ACKnowledgement/Negative ACKnowledgement (ACK/NACK) information in 1 bit.

Regarding STAs using a frame constructed in the above-described format, an AP VHT STA may support a non-AP VHT STA operating in a Transmit Opportunity (TXOP) power save mode in a BSS. For example, the non-AP VHT STA may operate in the TXOP power save mode in the active state. The AP VHT STA may switch the non-AP VHT STA to the doze state during a TXOP. For example, the AP VHT STA may command the non-AP VHT STA to switch to the doze state by transmitting a VHT PPDU with a TXVECTOR parameter, TXOP_PS_NOT_ALLOWED set to 0. Parameters in TXVECTOR transmitted along with the VHT PPDU by the AP VHT STA may be changed from 1 to 0 and maintained during the TXOP. Therefore, power may be saved during the remaining TXOP.

On the contrary, if TXOP_PS_NOT_ALLOWED is set to 1 and thus power saving is not performed, the parameters in TXVECTOR may be kept unchanged.

For example, as described before, the non-AP VHT STA may switch to the doze state in the TXOP power save mode during a TXOP, if the following conditions are satisfied.

- A VHT MU PPDU is received, and the STA is not indicated as a group member by an RXVECTOR parameter, Group_ID.
- An SU PPDU is received, and an RXVECTOR parameter, PARTIAL_AID is not 0 or does not match the partial AID of the STA.
- Although the STA determines that the RXVECTOR parameter, PARTIAL_AID matches the partial AID of the STA, the Receiver Address (RA) of the MAC header does not match the MAC address of the STA.
- Although the RXVECTOR parameter, Group_ID indicates that the STA is a group member, an RXVECTOR parameter, NUM_STS is set to 0.
- A VHT NDP Announcement frame is received, and the RXVECTOR parameter, PARTIAL_AID is set to 0 and does not match the AID of an Info field for the STA.
- The STA receives a frame with More Data set to 0 and Ack Policy set to No Ack, or transmits an ACK with Ack Policy set to a value other than No Ack.

The AP VHT STA may include a Duration/ID value set to the remaining TXOP interval and a NAV-SET Sequence (e.g., Ready To Send/Clear To Send (RTS/CTS)). Herein, the AP VHT STA may not transmit a frame to a non-AP VHT STA switching to the doze state based on the above-described conditions during the remaining TXOP.

For example, if the AP VHT STA transmits a VHT PPDU with the TXVECTOR parameter, TXOP_PS_NOT_ALLOWED set to 0 in the same TXOP and does not want the STA to switch from the awake state to the doze state, the AP VHT STA may not transmit a VHT SU PPDU.

For example, the AP VHT STA may not transmit a frame to a VHT STA that has switched to the doze state before timeout of a NAV set at the start of a TXOP.

If the AP VHT STA fails to receive an ACK after transmitting a frame including at least one of a MAC Service Data Unit (MSDU), an Aggregated-MSDU (A-MSDU), and a MAC Management Protocol Data Unit (MMPDU), with More Data set to 0, the AP VHT STA may retransmit the frame at least once in the same TXOP. For example, if the AP VHT STA fails to receive an ACK for a retransmission in the last frame of the same TXOP, the AP VHT STA may retransmit the frame after waiting until the next TXOP.

For example, the AP VHT STA may receive a Block Ack frame from a VHT STA operating in the TXOP power save mode. The Block Ack frame may be a response to an A-MPDU including an MPDU with More Data set to 0. Herein, the AP VHT STA is in the doze state and may not receive a response to the sub-sequence of a retransmitted MPDU during the same TXOP.

Further, a VHT STA that has operated in the TXOP power save mode and switched to the doze state may activate a NAV timer while it stays in the doze state. For example, upon expiration of the timer, the VHT STA may transition to the awake state.

Further, the STA may contend for medium access, upon expiration of the NAV timer.

HE PPDU Format

While a frame structure for IEEE 802.11ax has not been specified yet, the following frame structure is expected.

Figure 18:
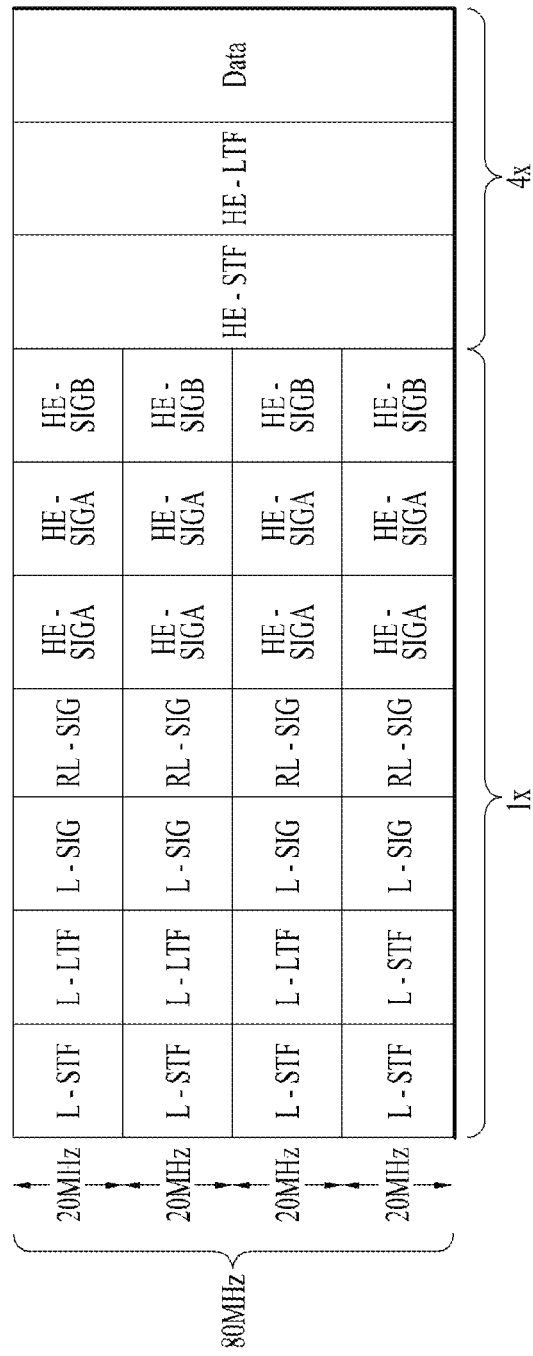
FIG. 18 is a view illustrating an exemplary High Efficiency (HE) Physical Layer Convergence Protocol (PLCP) Packet Data Unit (PPDU) format according to an embodiment of the present invention.

FIG. 18 is a view illustrating an exemplary High Efficiency (HE) PPDU format according to an embodiment of the present invention.

In IEEE 802.11ax, a legacy 1× symbol structure (3.2 μs) may be adopted for a part of a frame up to HE-SIG (HE-SIG A and HE-SIG B), and a frame structure having a 4× symbol (12.8 μs) structure may be used for HE-preamble and Data of the frame, as illustrated in FIG. 18. As far as the following description is applicable, there is no problem with applying the present invention even though the above structure is changed.

An L-part may be configured as in a legacy Wireless Fidelity (Wi-Fi) system, and thus may include L-STF, L-LTF, and L-SIG Generally, L-SIG preferably provides packet length information. A HE-part is a new part configured for the 11ax standard (High Efficiency). HE-SIG (HE-SIG A and HE-SIG B) may be interposed between the L-part and HE-STF, and HE-SIG may provide common control information and user-specific information. Specifically, HE-SIG A may provide common control information, and HE-SIG B may provide user-specific information.

HE-SIG B may include a common field and a user-specific field, and may be transmitted in a wide band that is equal to or wider than 40 MHz in the following manner.

FIG. 19 is a view illustrating a method for transmitting HE-SIG B in a wide band according to an embodiment of the present invention.

In general, in the case of 40-MHz or larger wideband encoding, HE-SIG B may carry independent information in two adjacent 20-MHz bands within a 40-MHz band. Control information transmitted in the 40-MHz band may be duplicated in an adjacent 40-MHz band.

In FIG. 19, reference numerals '1' and '2' are used to distinguish independent control information transmitted in two adjacent 20-MHz bands within a 40-MHz band. The control information may be duplicated per 40 MHz, as illustrated in FIG. 19.

As illustrated in FIG. 19, HE-SIG B may include a common field for transmitting common control information and a user-specific field for transmitting user-specific information. The user-specific field may include a plurality of blocks according to the number of users.

HE-SIG B, which is encoded per a 20-MHz band, may be configured in one of the following methods.

Figure 21:
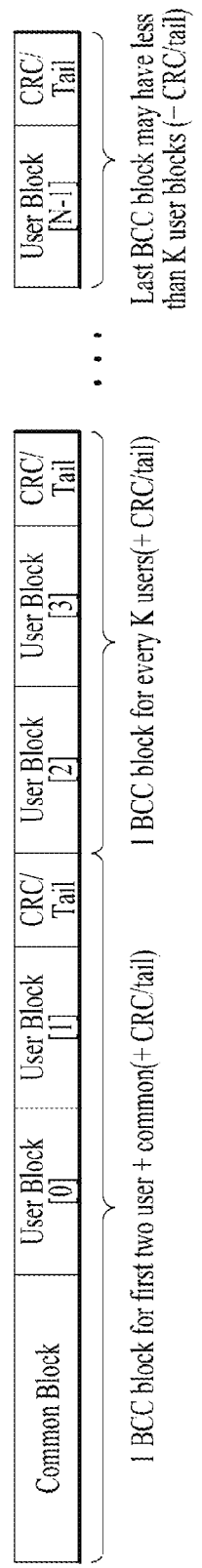
FIG. 21 is a view illustrating encoding of a user-specific field of HE-SIG B on a user basis according to an embodiment of the present invention.

FIG. 20 is a view illustrating a case in which a user-specific field of HE-SIG B is encoded on a group basis according to an embodiment of the present invention, and FIG. 21 is a view illustrating a case in which a user-specific field of HE-SIG B is encoded per each user according to an embodiment of the present invention.

Specifically, FIG. 20 illustrates that common information of HE-SIG B is block-coded (Binary Convolutional Coding, BCC) into one block, and Cyclic Redundancy Check (CRC)/tail bits is added to the block. Users are grouped into groups each including 'K' users (K is an integer equal to or larger than 2), and one user block is formed for every group of K users (STAs) in the user-specific field.

In contrast, FIG. 21 illustrates that one block is formed for each user without the above-described user grouping in the user-specific field of HE-SIG B. Under circumstances, one block may be constructed with common control information and partial user-specific information, as illustrated in FIG. 21.

It may be determined whether to add a CRC on a user basis or on a user group basis, or to add a CRC to common information and user information in combination in the above examples, according to a situation.

Figure 22:
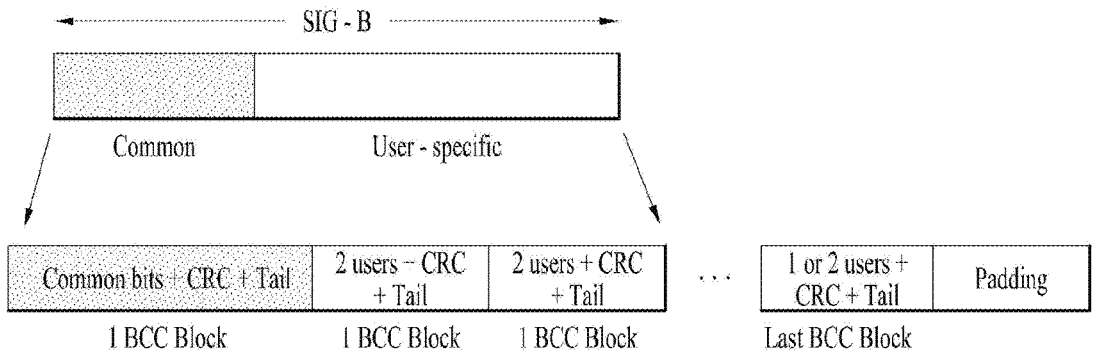
FIG. 22 is a view illustrating a method for configuring HE-SIG B in a specific 20-MHz band according to an embodiment of the present invention.

FIG. 22 is a view illustrating a method for configuring HE-SIG B in a specific 20-MHz band according to an embodiment of the present invention.

FIG. 22 may be considered to be a specific example of grouping users by twos, when users are grouped into groups each including a plurality of users in the user-specific field of HE-SIG B as illustrated in FIG. 20. In the example of FIG. 22, each block of the user-specific field includes CRC and tail bits, separately.

If the user-specific field is encoded based on grouping as described above, there may be one block including control information for a remaining STA which has not been grouped yet as illustrated in FIG. 22. Padding bits may be inserted after this block, for time-domain alignment, which will be described later.

According to the foregoing embodiments, HE-SIG B may include different information for STAs per each 20-MHz, and may be encoded and transmitted. Since HE-SIG B independently carries per-user information for a plurality of users per each 20-MHz band, the number of symbols in HE-SIG B or the length of HE-SIG B may be different per each 20-MHz channel. Accordingly, it may be difficult to align HE-SIG B which is transmitted per 20-MHz channel. If the time-domain length of HE-SIG B is different per each band, interference may occur to information received at each STA.

In this context, methods for aligning HE-SIG B per band will be described below.

Figure 23:
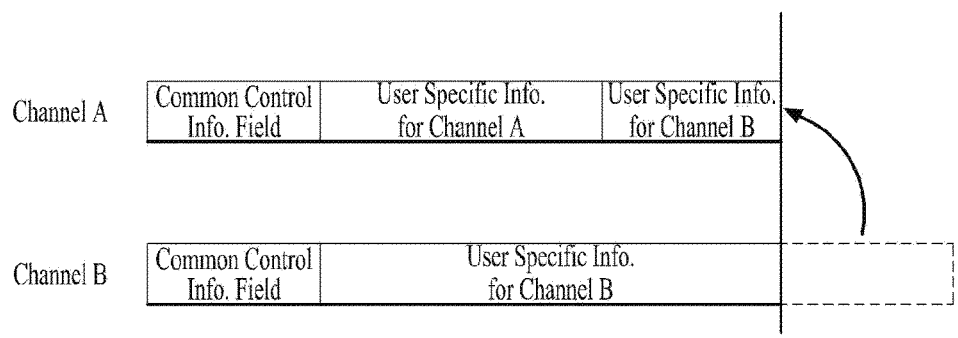
FIG. 23 is a view illustrating a method for aligning HE-SIG B according to an embodiment of the present invention.

FIG. 23 is a view illustrating a method for aligning HE-SIG B according to an embodiment of the present invention.

Referring to FIG. 23, the common field of HE-SIG B may include resource allocation information, and may be encoded into one encoding block with individual CRC and tail bits. Since the size of resource allocation information is the same per each 20-MHz band, the size of the common block is also the same per each 20-MHz band. Therefore, the difference between the lengths of HE-SIG B in 20-MHz bands is determined by user-specific information transmitted in the 20-MHz bands. In other words, the length of HE-SIG B per each 20-MHz band may be determined by the number of STAs supported per the 20-MHz band, and the number of supported STAs may be different per each 20-MHz band.

FIG. 23 is an exemplary view illustrating a case in which a number of STAs to which resources are allocated within Channel A having 20 MHz is less than a number of STAs to which resources are allocated within Channel B having 20 MHz. In this situation, it is proposed in the embodiment that user-specific HE-SIG B information for a part of the STAs of one 20-MHz band is transmitted on another 20-MHz band in order to align the HE-SIG B lengths in the 20-MHz bands. Therefore in FIG. 23, HE-SIG B of Channel A may carry resource allocation information for STAs to which resources are allocated in Channel B in addition to resource allocation information for STAs to which resources are allocated in Channel A.

Figure 24:
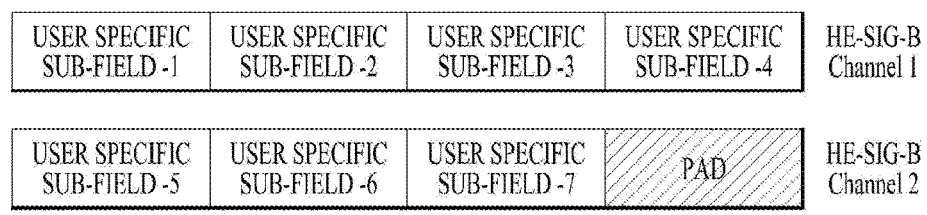
FIG. 24 is a view illustrating a method for transmitting resource allocation information separately in HE-SIG B of each band by an Access Point (AP) according to an embodiment of the present invention.

FIG. 24 is a view illustrating a method for transmitting resource allocation information distributedly in HE-SIG B in different bands by an AP according to an embodiment of the present invention.

If the total number of user-specific blocks is 8, the AP may distribute four blocks to Channel 1 and four blocks to Channel 2, for transmission. Further, the same thing may be applied to the total number of users. For example, if the total number of users is 18, the AP may divide the number of users by 2, distribute 9 users to each channel, and transmit HE-SIG B for the 9 users on each channel. If the total number of user-specific blocks is 7, the AP may distribute four blocks to Channel 1 and three blocks to Channel 2, as illustrated in FIG. 24. Notably, the AP may match the lengths of HE-SIG B between Channel 1 and Channel 2 by inserting padding bits in Channel 2. The padding bits may be positioned specifically, as illustrated in FIG. 22.

Meanwhile, the numbers of STAs for which information is transmitted in different bands may be determined as follows.

For example, if the numbers of STAs allocated to two 20-MHz bands in a 40-MHz channel bandwidth are p and p' (p>p'), respectively, STAs are grouped into groups each including k STAs and HE-SIG B is encoded in such a manner that one encoding block may be formed for every k STAs. Herein, HE-SIG B may be aligned between the 20-MHz bands in the following manner, and the numbers of STAs to which HE-SIG B is transmitted in the 20-MHz bands may be calculated as follows.

HE-SIG B may be aligned between the 20-MHz bands by adding the padding bits as many as the difference between the numbers of STAs for which transmission is performed in the 20-MHz bands. The size of the padding may be determined to be (p−p')×per user information size. Herein, a zero padding may be used or per user information of an STA may be repeatedly transmitted as much as the corresponding size.

However, matching the number of encoding blocks as much as possible between the 20-MHz bands may be preferred to alignment of the length of HE-SIG B between the 20-MHz bands just through use of padding bits.

For example, the number of encoding blocks each for every k grouped STAs in each 20 MHz may be calculated by floor(p/k). The numbers of STAs for the last blocks in the 20-MHz bands may be represented as R (i.e., mod(p, k)) and R' (i.e., mod (p', k)), respectively. Let the numbers of encoding blocks in the respective 20-MHz bands be denoted respectively by m and n (e.g., it is assumed that m is larger than n). Then, the difference between the numbers of encoding blocks may be divided equally to HE-SIG B in the 20-MHz bands, thereby achieving alignment between encoding blocks in the 20-MHz bands. That is, the number r of encoding blocks considered for alignment is calculated by floor((m−n)/2), and the numbers of encoding blocks in the respective 20-MHz bands are m−r and n+r, respectively. Accordingly, the number of STAs for the respective 20-MHz bands may be (m−r)×k+R and (n+r)×k+R', respectively. Herein, as many padding bits as the difference between (m−r) and (n+r) may be added, to thereby achieve further alignment.

If alignment is maintained as much as possible in terms of the number of encoding blocks, padding overhead may be reduced, compared to HE-SIG B alignment just through padding.

Meanwhile, alignment may be performed again using the number of STAs for the last encoding block after encoding block alignment, as follows.

After encoding blocks are aligned in the above manner, HE-SIG B of STAs included in the last encoding block in each 20-MHz band may be allocated to a 20-MHz band with fewer encoding blocks, for alignment. Therefore, the numbers of STAs in the respective 20-MHz bands may be respectively (m−r)×k and (n+r)×k+(R+R').

Because the difference between the numbers of encoding blocks, which is caused after encoding block alignment, is reduced by transmitting information about STAs included in the last code blocks in combination in one 20-MHz band, padding overhead may be reduced.

In the embodiment, if R+R'>k, for example, the number of STAs in the 20-MHz band with more encoding blocks may be calculated by calculating k−R' and subtracting k−R' from the total number of STAs in the 20-MHz band having more encoding blocks. That is, the number of STAs in the 20-MHz band may be calculated to be (m−r)×k+R−(k−R'). On the other hand, k−R' is added to the number of STAs in the other 20-MHz band and thus the number of STAs may finally be (n+r)×k+R'+(k−R') in the other 20-MHz band.

As described above, the difference between the numbers of STAs after encoding block alignment may further be narrowed using the numbers of STAs included in the last code blocks. As a consequence, the overhead of padding added after the alignment may be reduced.

Figure 25:
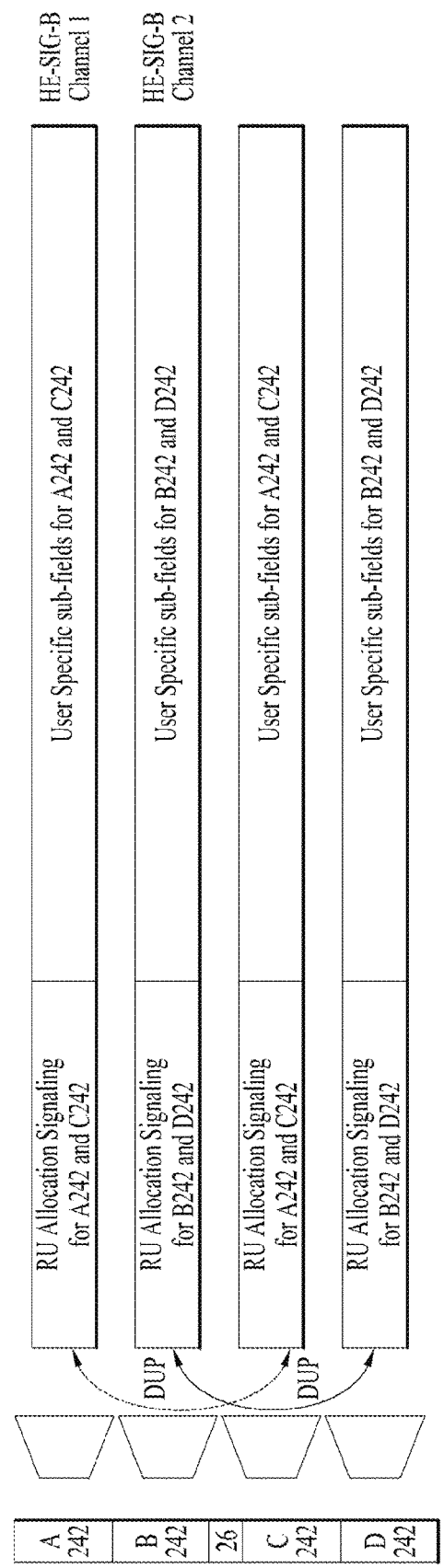
FIGS. 25 and 26 are views illustrating a method for allocating resources by transmitting HE-SIG B in a wide band according to an embodiment of the present invention.
Figure 26:
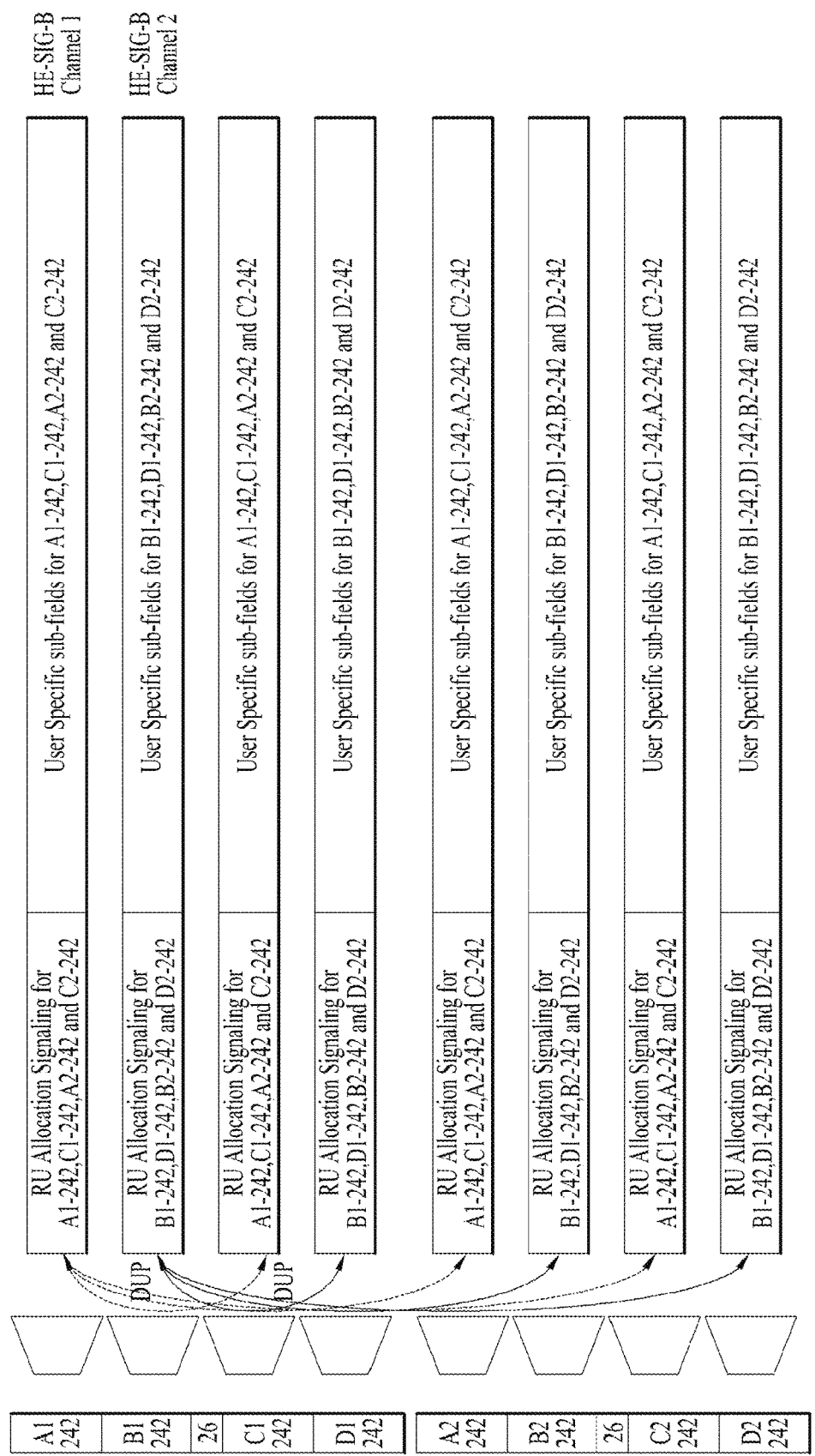

FIGS. 25 and 26 are views illustrating a method for allocating resources by transmitting HE-SIG B in a wide band according to an embodiment of the present invention.

Specifically, FIG. 25 illustrates a case of an 80-MHz band. In FIG. 25, independent control information is carried in each 20-MHz band within 40 MHz. From the perspective of a unit of 40 MHz, information delivered in one 40-MHz band is copied and transmitted in another adjacent 40-MHz band.

Therefore, HE-SIG B transmitted on Channel A includes resource allocation information of Channel C as well as resource allocation information of Channel A, and HE-SIG B transmitted in Channel B includes resource allocation information of Channel D as well as resource allocation information of Channel B.

Similarly in FIG. 26 illustrating 160-MHz transmission, HE-SIG B is copied on a 40-MHz basis. Therefore, HE-SIG B transmitted on Channel A1 may include resource allocation information of Channels A1, C1, A2, and C2.

Figure 27:
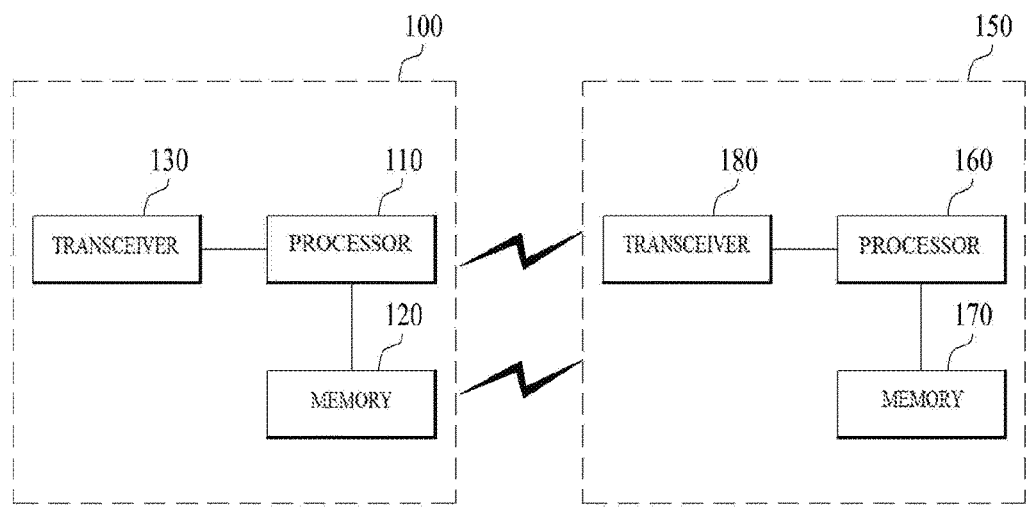
FIG. 27 is a block diagram illustrating exemplary configurations of an AP (or Base Station (BS)) and an STA (or User Equipment (UE)) according to an embodiment of the present invention.

FIG. 27 is a block diagram illustrating an exemplary structure of an AP (or BS) and an STA (or UE) according to an embodiment of the present invention.

An AP 100 may include a processor 110, a memory 120, and a transceiver 130. An STA 150 may include a processor 160, a memory 170, and a transceiver 180.

The transceivers 130 and 180 may transmit and receive wireless signals, for example, implement the Physical (PHY) layer in an IEEE 802 system. The processors 110 and 160 may be connected to the transceivers 130 and 180, and implement the PHY layer and/or the MAC layer in the IEEE 802 system. The processors 110 and 160 may be configured to perform one or a combination of two or more of the foregoing various embodiments of the present invention. Further, modules that perform AP and STA operations according to the foregoing various embodiments of the present invention may be stored in the memories 120 and 170 and executed by the processors 110 and 160. The memories 120 and 170 may be included inside the processors 110 and 160, or may be installed outside the processors 110 and 160 and connected to the processors 110 and 160 by known means.

The above descriptions of the AP 100 and the STA 150 are applicable to a BS and a UE, respectively in other wireless communication systems (e.g., an LTE/LTE-A system).

The above specific configurations of an AP and an STA may be implemented in such a manner that the various embodiments of the present invention may be implemented independently or simultaneously in a combination of two or more of them. Redundant descriptions will not be provided herein, for clarity.

Figure 28:
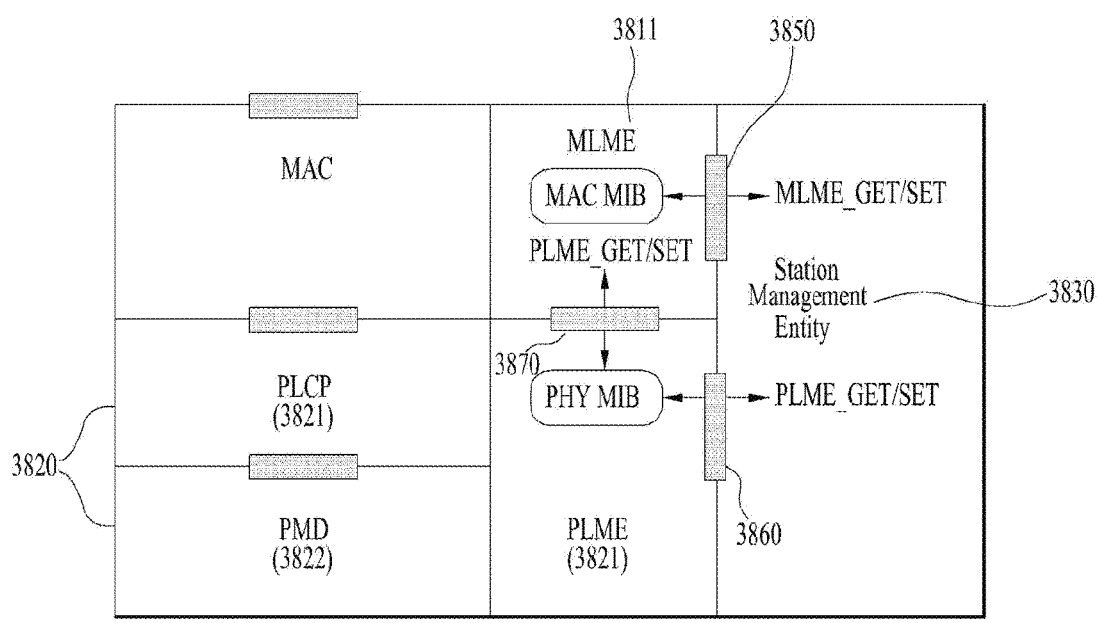
FIG. 28 is a view illustrating an exemplary structure of a processor in an AP or STA according to an embodiment of the present invention.

FIG. 28 is a view illustrating an exemplary structure of a processor in an AP or STA according to an embodiment of the present invention.

The processor of the AP or STA may have a multi-layered structure. FIG. 28 focuses on a MAC sublayer 3810 of a Data Link Layer (DLL) and a PHY layer 3820 among a plurality of layers. Referring to FIG. 28, the PHY layer 3820 may include a PLCP entity 3821, and a Physical Medium Dependent (PMD) entity 3822. Each of the MAC sublayer 3810 and the PHY layer 3820 includes a management entity conceptually called MAC sublayer Management Entity (MLME) 3811. These entities 3811 and 3821 provide layer management service interfaces through which layer management functions may be invoked.

In order to provide a correct MAC operation, a Station Management Entity (SME) 3830 is present in each STA. The SME 3830 is a layer-independent entity that may be viewed as residing in a separate management plane or as residing off to the side. The exact functions of the SME 3830 are not specified herein, but in general, this entity may be viewed as being responsible for such functions as gathering of information about layer-dependent statuses from various Layer Management Entities (LMEs) and similar setting of the values of layer-specific parameters. The SME 3830 may typically perform such functions on behalf of general system management entities and may implement standard management protocols.

The entities illustrated in FIG. 28 interact with one another in various ways. FIG. 28 illustrates a couple of examples of exchanging GET/SET primitives. An XX-GET.request primitive is used to request the value of a given Management Information Base (MIB) attribute. An XX-GET.confirm primitive returns an appropriate MIB attribute value if Status is set to "success" and otherwise, returns an error indication in a Status field. An XX-SET.request primitive is used to request that an indicated MIB attribute be set to a given value. If this MIB attribute implies a specific action, then this requests that the action be performed. An XX-SET.confirm primitive confirms that an indicated MIB attribute was set to a requested value, if Status is set to "success," and otherwise, it returns an error condition in the Status field. If this MIB attribute implies a specific action, then this confirms that the action was performed.

As illustrated in FIG. 28, the MLME 381 and the SME 3830 may exchange various MLME_GET/SET primitives via an MLME Service Access Point (MLME_SAP) 3850. Also, various PLCM_GET/SET primitives may be exchanged between the PLME 3821 and the SME 3830 via a PLME_SAP 3860 and between the MLME 3811 and the PLME 3870 via an MLME-PLME_SAP 3870.

The embodiments of the present invention may be implemented by various means, for example, in hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, or the like.

In a firmware or software configuration, the method according to the embodiments of the present invention may be implemented in the form of modules, procedures, functions, or the like that perform the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein. While the preferred embodiments of the present disclosure have been illustrated and described, the present disclosure is not limited to the foregoing specific embodiments, and those skilled in the art can make various modifications within the scope and spirit of the present disclosure claimed in the appended claims. Further, these modified embodiments should not be understood individually from the technical spirit or perspective of the present disclosure.

Both a product invention and a process invention are described in the present disclosure, and the descriptions of the inventions may be applied complementarily, when needed.

INDUSTRIAL APPLICABILITY

As described before, the embodiments of the present invention are applicable to various wireless communication systems including an IEEE 802.11 system.

What is claimed is:

1. A method for transmitting a frame to a plurality of stations (STAs) by an Access Point (AP) in a Wireless Local Area Network (WLAN) system, the method comprising:
   generating, at the AP, a radio frame including a plurality of signaling (SIG) fields including a SIG A field and a SIG B field, and a data field; and
   transmitting the radio frame to the plurality of STAs,
   wherein the SIG B field includes a common field and a user specific field following the common field, the common field including resource allocation information, and the user specific field including user specific information,
   wherein the common field and the user specific field of the SIG B field are encoded into a plurality of SIG B channels,
   wherein each SIG B channel includes a plurality of SIG B encoding blocks per 20 MHz band,
   wherein the SIG B field is separately encoded on each 20 MHz band,
   wherein, in each 20 MHz band, the common field is encoded into one Binary Convolutional Coding (BCC) block, and the user specific field is encoded into one or more BCC blocks each related to 'K' STAs, except for a last BCC block, where 'K' is a natural number equal to or larger than 2,
   wherein the plurality of SIG B channels includes a first SIG B channel transmitted in a first 20 MHz band and a second SIG B channel transmitted in a second 20 MHz band,
   wherein the first SIG B channel includes resource allocation information for the first 20 MHz band and a third 20 MHz band, and the second SIG B channel includes resource allocation information for the second 20 MHz band and a fourth 20 MHz band, and
   wherein a length of each of the plurality of the SIG B channels including the first SIG B channel and the second SIG B channel is set to be the same for every 20 MHz band.

2. The method according to claim 1,
   wherein at least one of the first SIG B channel and the second SIG B channel includes one or more padding bits at an end of the user specific field, and
   wherein a length of the one or more padding bits corresponds to a user specific field length difference for different 20 MHz bands before the one or more padding bits are added.

3. The method according to claim 1, wherein, in each 20 MHz band, the user specific field includes a SIG B encoding block that is block-coded for a group of 'K' STAs and a SIG B encoding block including user specific information for one or more STAs remaining from a STA grouping performed in a unit of 'K' STAs.

4. The method according to claim 3, wherein the AP determines a number of STAs to which resource allocation information is to be transmitted through each SIG B channel, in consideration of a total number of encoding blocks to be transmitted in the SIG B field.

5. The method according to claim 1, wherein the AP determines a number of STAs to which resource allocation information is to be transmitted through each SIG B channel, in consideration of a total number of the plurality of STAs.

6. The method according to claim 1, wherein the SIG B field carries user specific information independent for each of two adjacent 20 MHz bands within a 40 MHz band, and user specific information transmitted in the 40 MHz band is duplicated in another 40 MHz band adjacent to the 40 MHz band.

7. The method according to claim 1,
   wherein a channel width of the radio frame is 80 MHz or 160 MHz, and
   wherein the radio frame is transmitted using Multi-User Multiple Input Multiple Output (MU-MIMO).

8. The method according to claim 1,
   wherein the radio frame is transmitted on a channel including the first 20 MHz band, the second 20 MHz band, the third 20 MHz band and the fourth 20 MHz band, and
   wherein the third 20 MHz band carries the first SIG B channel, and the fourth 20 MHz band carries the second SIG B channel.

9. The method according to claim 1, wherein an encoding process for the first SIG B channel comprises:
   grouping one or more first-band STAs and one or more third-band STAs into one or more groups each having a predetermined number of STAs;
   generating a first BCC block that is common to all of the one or more first-band STAs and the one or more third-band STAs;
   generating one or more second BCC blocks specific to each of the groups; and
   generating a third BCC block specific to an ungrouped STA, if the ungrouped STA exists.

10. The method according to claim 9,
    wherein the first BCC block is followed by the one or more second BCC blocks,
    wherein the one or more second BCC blocks are followed by the third BCC block, if the ungrouped STA exists, and
    wherein the first SIG B channel further includes padding bits at an end of the first SIG B channel, if the first SIG B channel is shorter than the second SIG B channel.

11. The method according to claim 10,
    wherein the padding bits of the first SIG B channel are duplicated at least once in another 20 MHz band that is not adjacent to the first 20 MHz band.

12. The method according to claim 1,
    wherein the SIG A field carries common control information that is common to all of the plurality of STAs.

13. An Access Point (AP) transmitting a frame to a plurality of stations (STAs) in a Wireless Local Area Network (WLAN) system, the AP comprising:
    a processor to generate a radio frame including a plurality of signaling (SIG) fields including a SIG A field and a SIG B field, and a data field; and
    a transmitter to transmit the radio frame to the plurality of STAs,
    wherein the SIG B field includes a common field and a user specific field following the common field, the common field including resource allocation information, and the user specific field including user specific information,
    wherein the common field and the user specific field of the SIG B field are encoded into a plurality of SIG B channels,
    wherein each SIG B channel includes a plurality of SIG B encoding blocks per 20 MHz band,
    wherein the SIG B field is separately encoded on each 20 MHz band,
    wherein, in each 20 MHz band, the common field is encoded into one Binary Convolutional Coding (BCC) block, and the user specific field is encoded into one or more BCC blocks each related to 'K' STAs, except for a last BCC block, where 'K' is a natural number equal to or larger than 2,
    wherein the plurality of SIG B channels includes a first SIG B channel transmitted in a first 20 MHz band and a second SIG B channel transmitted in a second 20 MHz band,
    wherein the first SIG B channel includes resource allocation information for the first 20 MHz band and a third 20 MHz band, and the second SIG B channel includes resource allocation information for the second 20 MHz band and a fourth 20 MHz band, and
    wherein a length of each of the plurality of the SIG B channels including the first SIG B channel and the second SIG B channel is set to be the same for every 20 MHz band.

* * * * *